Sept. 29, 1942.         C. M. BLACKBURN           2,297,607
ELECTROLYTIC CONDENSER AND METHOD OF MAKING THE SAME
Filed Sept. 11, 1937         4 Sheets-Sheet 1

INVENTOR
Charles Marvin Blackburn
BY
ATTORNEY

Sept. 29, 1942.    C. M. BLACKBURN    2,297,607
ELECTROLYTIC CONDENSER AND METHOD OF MAKING THE SAME
Filed Sept. 11, 1937    4 Sheets—Sheet 3

INVENTOR
Charles Marvin Blackburn
BY
ATTORNEY

Patented Sept. 29, 1942

2,297,607

UNITED STATES PATENT OFFICE 2,297,607

ELECTROLYTIC CONDENSER AND METHOD OF MAKING THE SAME

Charles Marvin Blackburn, Indianapolis, Ind., assignor to P. R. Mallory & Co., Inc., Indianapolis, Ind., a corporation of Delaware Application September 11, 1937, Serial No. 163,431

15 Claims. (Cl. 175—315)

This invention relates to electrolytic condensers and methods of making the same.

An object of the invention is to produce an electrolytic condenser of higher capacity for a given electrode size than has theretofore been possible and to maintain good longitudinal conductivity through the electrode layer.

Another object of the invention is to improve the methods of making electrolytic condensers.

Other objects of the invention will be apparent from the following description and accompanying drawings taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawings.

In its simplest form an electrolytic condenser consists of a pair of metal plates in contact with a film-forming electrolyte, at least one of said plates being made of film-forming metal having an electrolytically formed current-blocking layer on its surface, the electrolyte being capable of maintaining the current blocking layer intact during operation of the condenser. The current blocking layer serves as the condenser dielectric, the plate upon which the layer is formed comprising one electrode of the condenser and the electrolyte comprising the other electrode. It will thus be evident that the capacity of the condenser for a given thickness of current blocking layer is directly proportional to the area of the plate surface upon which the layer is formed and which is in contact with the electrolyte.

Heretofore electrolytic condensers have been made with aluminum plates in contact with the electrolyte, at least one of the electrodes having a current blocking film formed thereon. In one form of these condensers, commonly known as the dry electrolytic condenser, the electrodes comprised strips of aluminum foil rolled together with suitable spacers of porous material, such as gauze, paper, non-fibrous sheet cellulose materials and the like. The electrolyte was then absorbed in the porous spacers. Where ordinary smooth aluminum sheets were used, it is evident that the active surface area which determines the capacity of the condenser was equal to the plane area of the electrode upon which the current blocking layer was formed.

Subsequently it was found that the capacity of the condenser could be materially increased by etching, sand-blasting or scratch-brushing the aluminum surface, before the current blocking layer was formed thereon, in order to increase its effective area. By these means, the actual microscopic area was increased. With electrodes produced by some chemical and electrochemical etching processes, an effective area has been obtained which was four or five times the area of plain foil of the same size, with a corresponding increase in condenser capacity. This gain in capacity is of advantage since it is thereby possible to provide four or five times the previous capacity in a condenser of a given size. Conversely, where a given capacity is required, it can be provided in a condenser only one-fourth or one-fifth as large as was formerly required.

I have now discovered a means for making a condenser electrode and for using the electrode in an electrolytic condenser whereby an increase in capacity for a given size of electrode can be attained which is much greater than was ever attained by any previous means within my knowledge. My electrode is formed by depositing upon a base material of large surface area a quantity of film-forming metal, such as aluminum, so that the metal is distributed over the surface of the material and partakes of its large surface area. Preferably, the metal is deposited by a process which in itself tends to produce a large surface area on the metal. I also provide a conductive means associated with the electrode so formed to insure a distribution of electricity to all parts of the surface and provide a reliable connection to the terminals of the condenser.

For a medium of high surface area upon which to deposit the aluminum or other film-forming metal I have found cloth to be the most suitable. The cloth may be either woven or knit but I generally prefer woven cotton gauze or muslin.

The best means which I have found for applying the aluminum or other film-forming metal to the cloth or other porous spacers comprises spraying the metal onto the cloth by the metal spray process known as the Schoop process. According to this method, the metal in the form of wire of high purity is melted in an oxy-acetylene flame and is atomized by a blast of compressed air and projected against the surface upon which it is to be deposited.

In order to insure electrical conductivity to all parts of the porous electrode thus produced, I prefer to place in contact with the cloth layer a contiguous strip of metal, preferably of the same composition as the metal deposited on the cloth. This strip of metal may, for instance, comprise a length of aluminum foil which is laid in face-to-face contact with the gauze, preferably before the spraying operation. I have found that when the metal is subsequently sprayed onto the cloth that a certain amount of it penetrates through the cloth and comes into contact with the strip of foil, thereby cementing it to the cloth layer. The strip of metal may or may not be the same width as the strip of cloth used.

Cloth or gauze has the advantage when used as a base for depositing the finely divided metal particles, of having a large surface area upon which the metal can be deposited. When the metal is sprayed onto the cloth, particularly the more loosely woven open-mesh fabrics having loosely twisted threads, the individual metal particles appear to penetrate into the mass of fibres and be deposited upon the individual fibres within the threads as well as the more readily accessible surface fibres. The porosity of the cloth is, to a large extent, retained after spraying so that the condenser electrolyte may be absorbed in the spaces and fibres of the cloth base due to the characteristic wick-action of the porous layer. The electrode thereby provides additional electrolyte holding capacity over that of plain or etched foil electrodes. The large effective surface of the electrode, i. e., the area of the current-blocking layer, is the result not only of the large surface area imparted by spraying or otherwise depositing the metal in small particles or droplets which are bonded together but also by the large surface area of the base, such as cloth, upon which the metal is deposited.

It is preferred to use unsized muslin or cotton gauze which has been bleached and thoroughly washed to eliminate impurities. I have found that fabrics having a wide range of thread size and spacing is satisfactory. For best satisfaction the mesh should be sufficiently open so that even after spraying a certain amount of light will pass through the material where no backing is provided. Generally speaking, with the same density of metal deposit the greater the number of threads per inch the higher the capacity obtainable in the finished condenser. For instance, a cloth having about 70 threads per inch each way produces a higher capacity than a cloth having about 40 threads per inch. In the preferred embodiment of my invention I use a pair of superposed gauze strips with one or two narrow strips of very thin aluminum foil interleaved between them, one of the gauze layers being of 40 : 44 mesh and the other being 70 : 72 mesh. This electrode has about 12 times the capacity of plain foil. Using 40 : 44 mesh for both layers a capacity advantage of 8 or 9 : 1 is obtained. Using 70 : 72 mesh for both layers brings the ratio to plain foil to 14 : 1. With heavy muslin a capacity advantage over plain foil of 20 : 1 is obtainable.

While woven cotton fabrics, such as muslin or gauze, appear to be generally most suitable as a base for the deposited metal, other materials may be used such as the various synthetic fabrics like rayon and acetate silk, natural silk, cloth woven from spun glass, and thin layers of loosely matted fibres such as cotton, glass, loose felt or loosely felted paper, also embossed or perforated paper. It may also be satisfactory to spray the metal onto a layer of relatively closely spaced parallel threads or fine strips of fibrous material.

The principal object in using a contiguous contacting layer of foil or the like, which becomes integrally bonded to the deposited porous layer during the spraying operation, is to insure that electric conductivity will be preserved to all parts of the deposited layer throughout the life of the condenser. I have found, for instance, that a lightly sprayed cloth layer may not, of itself, have sufficient metallic continuity to give satisfactory conductivity in the plane of the cloth although with a continuous foil backing layer in intimate contact the electric currents will be distributed to all points of the porous layer and the advantages of its high surface area may be fully realized.

Even when the cloth is heavily sprayed with the film-forming metal so as to have an initially good current path in the plane of the layer it is sometimes subject to cracking, especially when sharply bent or rolled into a small radius. Such a discontinuity may not be readily apparent but may develop an open circuit later on in the operation of the condenser. The contiguous conductive foil effectively bridges such points of discontinuity and maintains the circuit to all parts of the electrode under these conditions.

Where condensers are produced by winding up strips of the sprayed cloth with suitable spacers into a roll the principal cracking encountered is across the strips (or longitudinal to the axis of the roll). To insure a circuit it is not, in such cases, necessary to provide a contacting foil extending to the edges of the strips but sufficient insurance of a complete circuit can be had by providing one or two narrow strips longitudinal to the cloth.

If aluminum foil is used it can be of extreme thinness, for example, foil of .0003 inch in thickness may suitably be used. However, for A. C. condenser applications thicker foil may be required. The foil may be embossed, perforated, sand blasted, etched or scratch brushed to improve adherence of the sprayed metal. It should also be free of oil or other foreign matter.

Since the foil is largely covered by additional sprayed metal it is possible to use a foil of lower purity than is required for plain or etched foil electrodes. Furthermore, a different metal may be used for the foil provided it is sufficiently close to the film-forming metal in the electro-chemical series to avoid deleterious electrolytic corrosion. The metal backing can also be made in other forms such as wires or wire gauze. The wires may be interleaved between the cloth layers or may be woven or stitched into the cloth.

Figures 1, 2, 3, 4, 5, 6, 7, 8:
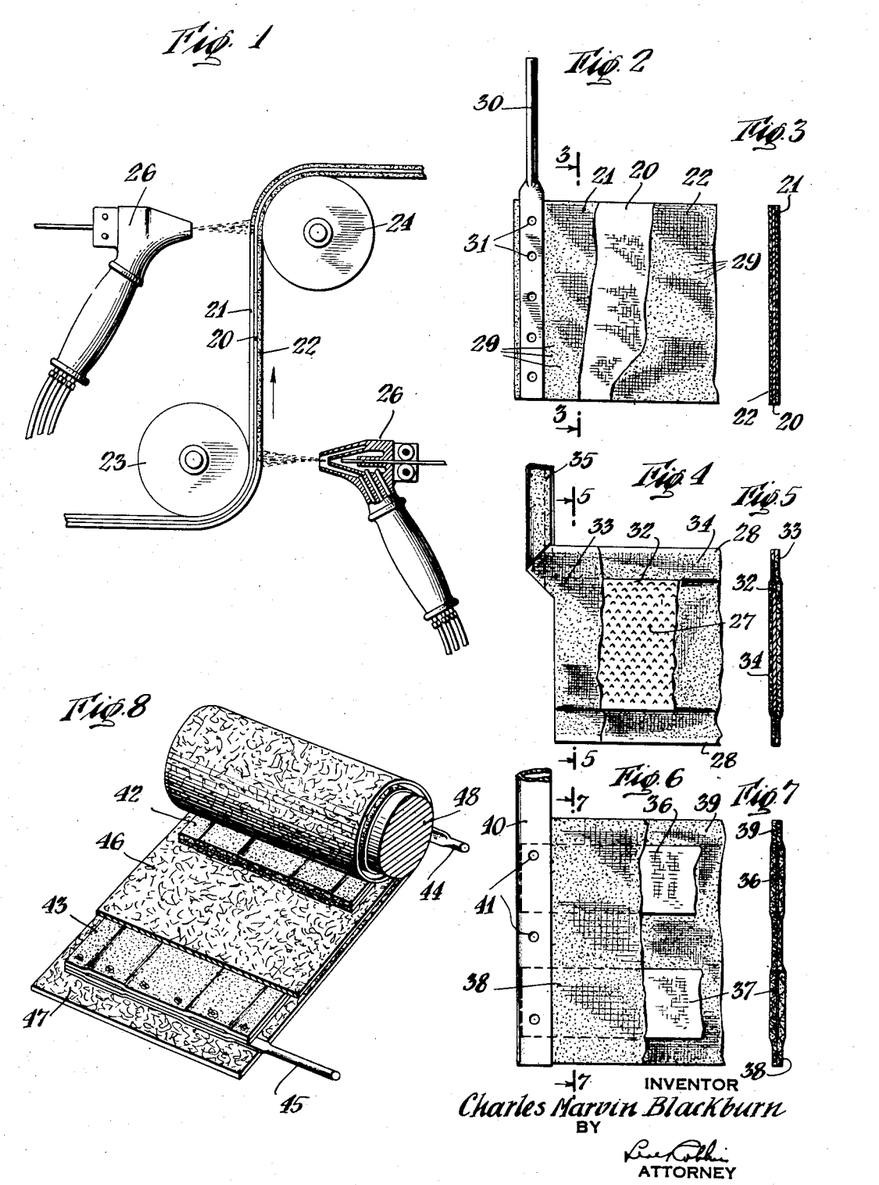
Figure 1 illustrates diagrammatically one method of making an electrode for electrolytic condensers according to my invention.
Figure 2 is a face view of a portion of one form of condenser electrode made according to my invention with parts broken away to show the structure thereof.
Figure 3 is a section on the line 3—3 of Figure 2.
Figure 4 is a fragmentary view of a modified electrode made according to my invention.
Figure 5 is a section on the line 5—5 of Figure 4.
Figure 6 shows a still further modification of condenser electrode.
Figure 7 is a section on the line 7—7 of Figure 6.
Figure 8 shows an electrolytic condenser in partly assembled state, embodying features of my invention.

Figure 1 illustrates one method of carrying out my invention. According to this method a strip of foil 20 is led between two strips of gauze 21 and 22, respectively, over a roll 23 and then over a second roll 24 disposed some distance above it. As the assembled strips pass along over the rolls in the manner described, finely divided aluminum is sprayed onto both sides of the assembly by the Schoop spray guns 25 and 26. These may be moved back and forth laterally, if desired, to distribute the spray evenly over the entire surface of the cloth. Ordinarily one spraying on each side is sufficient, but the operation may be repeated if desired. The spray guns may preferably be located about six inches from the surface and the flame regulated to give a reducing atmosphere.

It appears that the sprayed metal penetrates between the individual fibres in such a manner that the surface of the inner fibres are coated with metal, as well as the fibres directly exposed to the spray. A considerable range of densities of sprayed layers may be used satisfactorily for electrolytic condensers. For dry electrolytic condensers the sprayed electrode should be left sufficiently flexible to permit subsequent bending or rolling. As a rough test I have found that if the duration and density of the spray is sufficient so that no specular reflection is obtained from the interleaved foil through the interstices in the gauze a satisfactory coating is obtained.

The layers 20, 21 and 22 are found to be cemented together by the sprayed metal so that they can be separated only with considerable difficulty. After spraying, the electrode may be electrolytically film-formed in a manner well known in the electrolytic condenser art, for instance, by passing the electrode through a solution of borax and boric acid and passing a unidirectional electric current between the electrode and the solution. It is found that sprayed aluminum electrodes generally form up better than aluminum foil due to the fact that this method produces a clean metal surface rather than an oily one such as results from processing the foil. Volatile impurities are volatilized out of the aluminum as it passes through the oxy-acetylene flame.

The surface area of the aluminum is very great due to two causes: (1) The material upon which the aluminum is deposited (cloth) has a very large area because of the multiplicity of cotton fibres from which it is formed. (2) When the aluminum is deposited by the spray process, it is broken up into many minute particles which are cemented to the surfaces of the fibres and cemented together in a porous mass when they impinge upon the cloth base. The surface area thus produced is provided with a current blocking film by the forming operation just described and as a result an electrode having very high capacity possibilities is produced.

Figures 2 and 3 show the completed electrode comprising foil 20 and cloth layers 21 and 22 with aluminum particles 29 sprayed thereon. For use in a condenser, such as a dry electrolytic condenser, a terminal 30 may be provided comprising a piece of aluminum wire flattened over a portion of its length. The flattened portion is laid along one end of the electrode and a series of holes 31 are punched through the assembly after which the burrs raised by the punch are flattened down over the surface to provide interlocking contacting portions.

Figures 4 and 5 show a modified electrode in which foil 32 is narrower than the two cloth layers 33 and 34 so that two marginal portions are provided in which the cloth layers 33 and 34 are cemented together by the sprayed metal. The foil is embossed with numerous closely spaced irregularities 27 to improve adhesion. Narrow strips 28 at the extreme edges of the gauze may be left unsprayed (protected by masks during spraying) so that the plain gauze will protect the edges of the electrode and prevent short circuits or sparking between electrodes in the finished condenser. The terminal member 35 shown in this figure is formed by suitably cutting and folding an integral portion of the electrode.

Figures 6 and 7 show another form of electrode in which two narrow strips of aluminum foil 36 and 37 are disposed side by side in spaced relation between the two cloth layers 38 and 39, providing added insurance of circuit continuity. Cloth layer 38 is of coarser mesh than layer 39. A terminal 40 is provided which comprises a strip of heavy aluminum foil doubled so as to receive the end of the electrode after which a series of holes 41 are punched therein and the burrs pressed flat to secure the members together and provide an integral metallic connection therebetween.

Due to the exaggeration of foil and cloth thicknesses in Figures 5 and 7 the electrodes appear to be of much greater thickness at points where foil is included than where no foil is present. In actual practice the electrodes appear to be of substantially the same thickness throughout. The foil strips aid considerably in attaching the terminals 30 or 40 to the electrodes and in providing good electric contact therewith.

Figure 8 shows a partly-assembled dry electrolytic condenser according to my invention. Electrodes 42 and 43 are identical in construction each comprising two gauze layers interleaved with a pair of narrow metal foils the assembly being sprayed and filmed as heretofore described. Their terminals 44 and 45, respectively, are secured by punching to their ends. The electrodes are interleaved with a pair of electrolyte-pervious spacers 46 and 47 and the assembly is wound onto a mandrel 48 of wood, cardboard, metal or other suitable material to form a condenser roll. In some cases the mandrel may be eliminated.

The spacers 46 and 47 may be of paper or any other suitable sheet material known to the art such as gauze, non-fibrous regenerated sheet cellulose and cellulose compounds (perforated if desired), gelatin, parchmentized paper, lacquered paper, dialyzing membranes, spun glass cloth or mat, conductive impregnated cellulose-paper and composite spacers such as double paper layers, cloth-paper layers, paper-Cellophane, cloth-Cellophane and also triple layers formed of any three of these in combination.

The spacers and the electrodes themselves are saturated with a film-maintaining electrolyte adapted to maintain the current-blocking film on the electrodes. The electrodes and the spacers may be run through a tank of the electrolyte before wrapping or the condenser roll may be immersed in the electrolyte after the wrapping is completed. Where the condenser is desired for use in A. C. circuits both electrodes are film-formed at the same voltage before assembly. For D. C. use only one electrode need be formed or for a semi-polarized condenser one electrode may be filmed at a lower voltage than the other.

The condensers may be subjected to an electrolytic aging after assembly and impregnation to heal any damaged areas of the current-blocking film.

While the electrolytes formerly used in dry electrolytic condenser manufacture may be used with success with my novel electrodes I have found it to be of some advantage to have an electrolyte of low viscosity. The important thing is that the electrolyte be thin enough to readily flow into the fine openings and recesses in the porous electrodes. I have found that an electrolyte of low viscosity and substantially free from crystals at time of impregnation to be most suitable. For instance, an electrolyte made according to the following method may be used to advantage:

Boric acid ______________________ ounces__ 20
Ammonium hydroxide ______________ c. c__ 135
Ethylene glycol __________________ c. c__ 640 are boiled together until the boiling point of the composition reaches approximately 120° C. to 140° C. depending on the sparking voltage required. The viscosity of the electrolyte may then be between 1 and 3 at 200° F. as compared with water at 60° F.

Other electrolytes of the polyhydric alcohol type comprising glycol, glycerol or the like reacted with a weak acid such as boric, citric, malic, lactic, tartaric or phosphoric acid with or without salts of those acids such as their sodium, ammonium or potassium salts may also be used. Also electrolytes not employing polyhydric alcohols may be suitable such as ammonium lactate or combinations of acids and their salts which form viscous or semi-solid electrolytes as well as film-forming conductive lacquer compositions.

Figure 9:
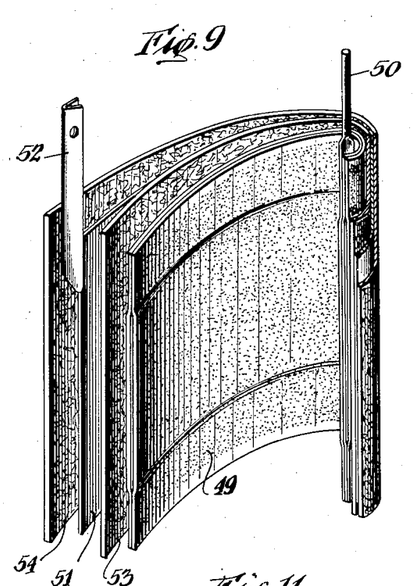
Figure 9 shows a modified form of condenser in partly assembled state.

Figure 9 shows another condenser partly assembled wherein the anode (filmed electrode) 49 is of one of the types I have described, having a terminal 50 and the cathode is a sheet of aluminum foil 51 having a tab 52, the electrodes being interleaved with electrolyte-pervious spacers 53 and 54. In lieu of these spacers the cathode foil 51 may be coated with a raised lacquer pattern which will serve as a spacer.

Figure 10:
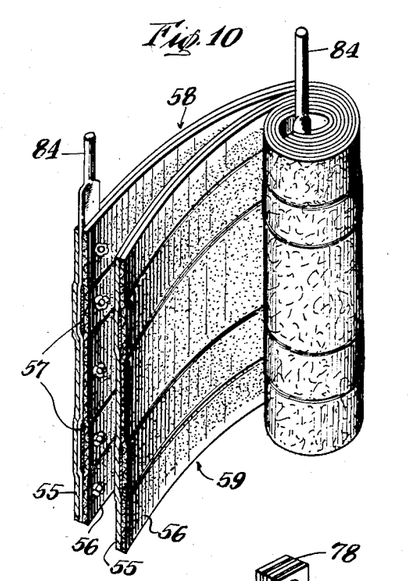
Figure 10 shows a still further form of condenser, partly assembled.
Figure 14:
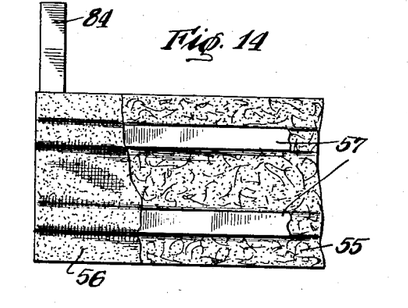

A modified electrode-spacer assembly is illustrated in Figures 10 and 14 wherein a sheet of spacer paper 55 is assembled with a sheet of gauze 56, a pair of aluminum foil strips 57 being interleaved between them. The assembly is sprayed with aluminum on the gauze side so that the spray penetrates through the gauze bonding the paper and foils to it. However, the spray does not go through the paper and the exposed surface of the paper is free of metal. Thus the paper serves as an integral spacer. Two such electrodes 58 and 59 may be assembled as shown in Figure 10 without the necessity of additional spacers, and the assembly impregnated with electrolyte.

Figure 11:
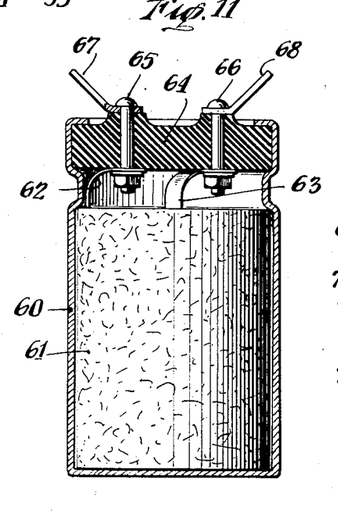
Figure 11 shows a completed condenser made according to my invention.

Figure 11 shows a completed dry electrolytic condenser embodying features of my invention. This condenser comprises a can or container 60 in which the rolled assembly 61 of my novel electrodes and spacers is inserted after being saturated with electrolyte. Tab terminals 62 and 63 are riveted to the inside of insulating cover 64 by rivets 65 and 66, respectively, which pass through the cover. Terminal lugs 67 and 68 are connected respectively to the rivets on the outside of the cover to provide terminals for the condenser.

Figure 12:
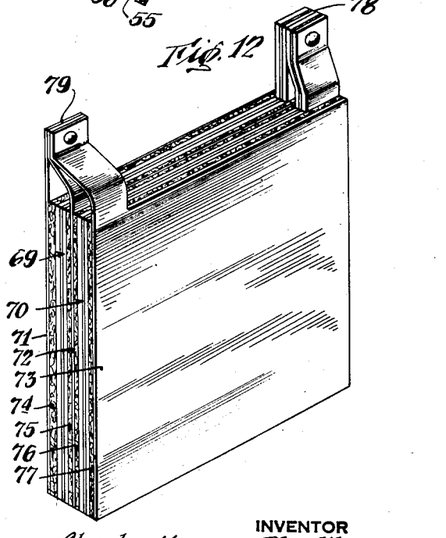
Figure 12 shows a flat form of condenser embodying features of my invention.

Because of the tremendous capacities obtainable in small areas by the use of my invention it may sometimes be possible for small condensers to assemble the electrodes and spacers in flat relationship, as illustrated in Figure 12. As shown in this figure, the two electrodes 69 and 70 made as described herein, are separated from the three sheet aluminum electrodes 71, 72 and 73 by electrolyte holding sheet spacers 74, 75, 76 and 77. The tabs 78 of the electrodes 69 and 70 are secured together to form one terminal and the tabs 79 of the sheet aluminum electrodes are secured together to form the other terminal of the condenser. The assembly thus formed may be held together in any suitable manner such as is well known for similar condenser constructions in the prior art. It is also contemplated that a shell of molded plastic material, such as synthetic resin, may be molded about the assembly to serve as a case and a sealing means.

Figure 13:
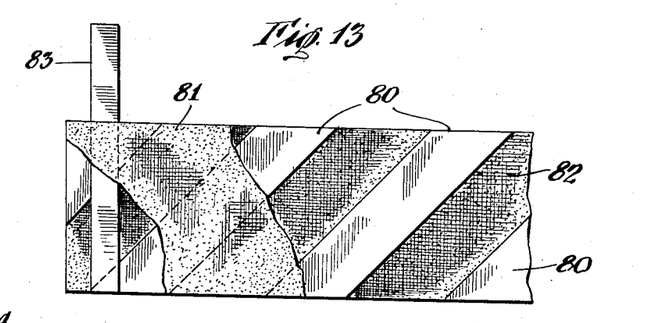
Figures 13 to 21 inclusive show modified forms of electrodes comprising variations of my invention.

Figure 13 shows another possible form of electrode wherein foil strips 80 are placed diagonally between the two cloth layers 81 and 82. The foils are spaced apart but their ends sufficiently overlap any lateral line across the electrode so that a crack along such a line will be adequately bridged by the foil. A tab is provided for this electrode by inserting a narrow strip of foil 83 between the cloth layers before spraying, the tab being thereby sprayed in and integrated with the electrode.

Figure 14 shows a similar tab terminal 84.

Figure 15:
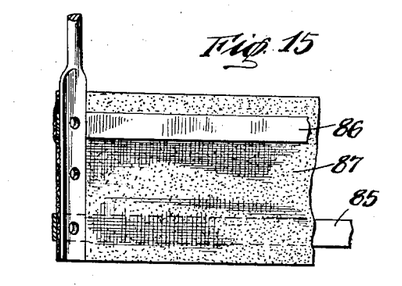

Figure 15 shows a modification in which a pair of narrow strips of foil 85 and 86 are laid in staggered relation on the two faces of a strip of gauze 87 and the assembly is sprayed on both sides to form an integral electrode.

Figure 16:
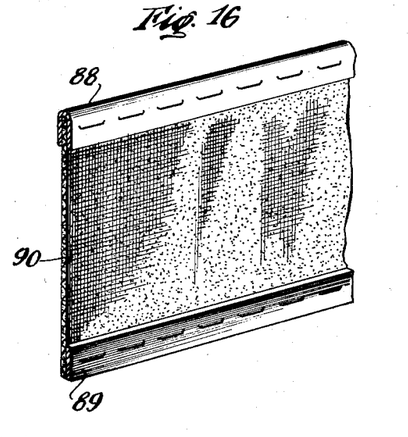

Figure 16 illustrates how narrow strips of foil 88 and 89 may be stitched along the edge of cloth strip 90 before spraying. Foil 88 is folded over the edge and stitched to the cloth. Foil 89 is merely laid along one side. It is obvious that foil 89 could also be stitched along the middle of the cloth strip if desired.

Figure 17:
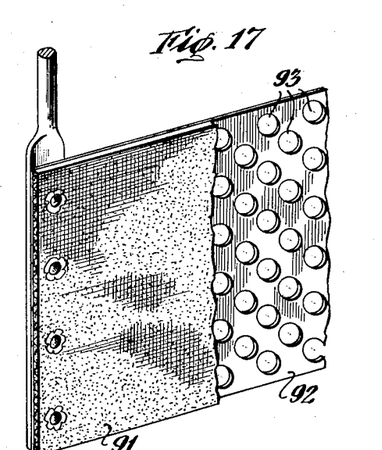

Figure 17 shows an electrode formed by laying a strip of gauze 91 on a strip of foil 92 perforated with numerous holes 93, the assembly being sprayed together by spraying on one or both sides.

Figure 18:
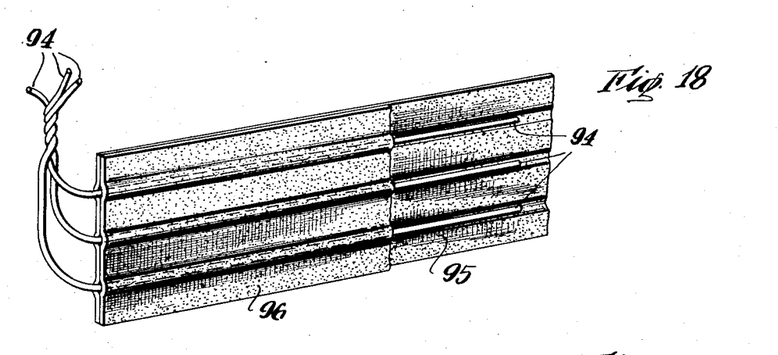

In Figure 18 is shown an electrode produced by laying fine wires 94 between two layers of gauze 95 and 96 and then spraying both sides. The wires 94 may be brought out at one end of the electrode to form a terminal, as shown.

Figure 19:
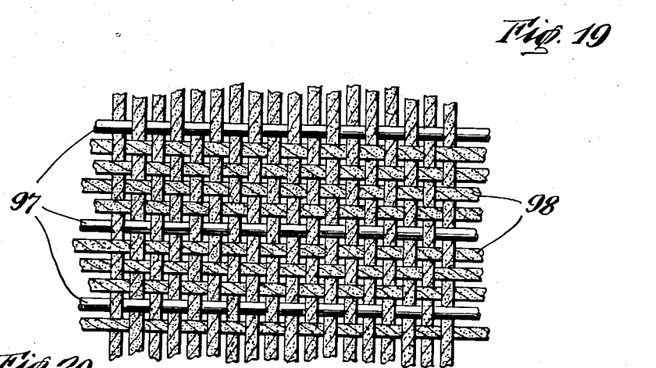

Figure 19 shows a special form of cloth 98 produced by substituting fine wires 97 for warp threads at spaced intervals when the cloth is woven. A single layer of this cloth may then be sprayed to form an electrode, the wires 97 insuring continuity of circuit lengthwise of the cloth strip.

Figure 20:
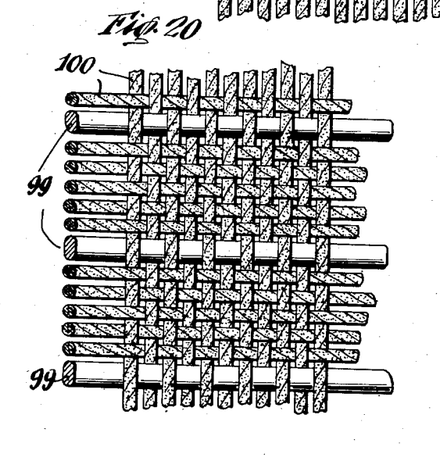

Figure 20 shows a modification of the cloth of Figure 19 wherein the wires 99 which are woven in the cloth 100 are originally of larger diameter than the threads of the cloth. Before spraying, the woven cloth is passed between a pair of rollers which flatten the wires and produce a cloth layer of uniform thickness, as shown.

Figure 21:
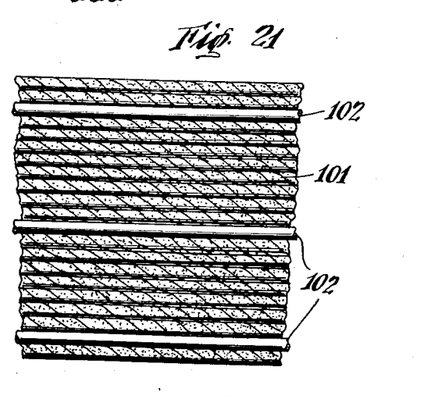

Figure 21 shows an electrode wherein a large number of parallel threads 101 with occasional fine wires 102 are sprayed with the film-forming metal to form an integral electrode. The sprayed metal holds the threads and wires together in a uniform sheet.

While a number of combinations have been shown and described it will be apparent that still further combinations are suggested by the description and drawings and it is contemplated that these further combinations are within the scope of my disclosure. For instance any two electrodes may be used in combination with each other or with electrodes of the prior art. Likewise the various terminals shown and those of the prior art may be used with all the electrodes and may be located either at the end of the electrodes or at intermediate points along their length. Furthermore the finely divided deposited film-forming metal may be deposited in other ways than the exact method shown although this method appears to be most suitable at present. One advantage of this method of deposition resides in the fact that all impurities, oil and the like which would hinder film-formation are volatilized during spraying so that a surface of high purity is produced. I find it convenient to run the electrodes through a forming bath immediately as they come off the spraying machine. While I have found cloth to be the most suitable base for receiving the sprayed metal and have directed the description principally to this material I contemplate that other suitable sheet materials of large surface area may be used, some of which are mentioned in the specification.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

What is claimed is:

1. An electrode for electrolytic condensers comprising a layer of cloth and a layer of paper disposed in direct face-to-face contact throughout substantially the entire effective electrode area and a multiplicity of particles of film-forming metal adhering to the fibres of said layers and to each other, and an additional metallic conductor between said layers and in contact therewith and with said metal particles.

2. An electrode for electrolytic condensers comprising a layer of open mesh cloth and a layer of paper disposed in direct face-to-face contact throughout substantially the entire effective electrode area and a spray-deposit of aluminum on and in said cloth layer and bonding said layers together, and a metal terminal member sandwiched between said layers and bonded thereto by said spray-deposit.

3. An electrode for electrolytic condensers comprising a layer of open mesh cloth and a layer of paper disposed in face-to-face contact and a spray-deposit of aluminum on and in said cloth layer and bonding said layers together, and a metal terminal member sandwiched between said layers and bonded thereto by said spray-deposit, the outer face of said paper layer being free of sprayed metal.

4. An electrode for electrolytic condensers comprising at least two layers of fibrous flexible material disposed in direct face-to-face contact throughout substantially the entire effective electrode area and a multiplicity of particles of film-forming metal adhering to the fibers of said layers and an additional metallic conductor between said layers and in electrical contact with the particles of film-forming metal.

5. An electrode for electrolytic condensers comprising at least two layers of fibrous flexible material disposed in direct face-to-face contact throughout substantially the entire effective electrode area and a multiplicity of particles of film-forming metal adhering to the fibres of said layers and bonding said layers together.

6. An electrode for electrolytic condensers comprising two open mesh cloth layers disposed in direct face-to-face contact throughout substantially the entire effective electrode area and a spray-deposit of aluminum adhering to the fibres of said layers and bonding said layers together.

7. An electrode for electrolytic condensers comprising two cloth layers disposed in direct face-to-face contact throughout substantially the entire effective electrode area and a multiplicity of particles of aluminum adhering to the fibres of said layers and an additional aluminum conductor between said layers, said particles also adhering to said conductor.

8. An electrode for electrolytic condensers comprising two open-mesh cloth layers disposed in direct face-to-face contact throughout substantially the entire effective electrode area and a spray-deposit of aluminum adhering to the fibres of said layers and bonding said layers together, and an aluminum foil strip of lesser area than said cloth layers between said layers and bonded thereto by said spray-deposit.

9. The method of making electrodes for electrolytic condensers which comprises leading a pair of layers of flexible fibrous material and an inter-leaved metallic conductor past a spray of molten film-forming metal to deposit said metal in said layers and bond said layers to said conductor.

10. The method of making electrodes for electrolytic condensers which comprises leading a sandwich assembly of two open-mesh cloth layers and an interposed aluminum foil strip past sprays of molten aluminum directed at opposite sides thereof to deposit a porous deposit of aluminum therein and bond said assembly into a unit.

11. An electrode for electrolytic condensers comprising a metal foil layer, at least one layer of flexible fibrous material disposed in direct face-to-face contact therewith throughout substantially the entire effective electrode area, at least one of said layers being perforate, and a spray deposit of film-forming metal spray-cementing said layers together and providing a film-forming surface of high surface area for the electrode.

12. An electrode for electrolytic condensers comprising at least two layers of sheet flexible material disposed in direct face-to-face contact throughout substantially the entire effective electrode area, at least one of said layers being perforate, and at least one of said layers being fibrous, and a multiplicity of particles of film-forming metal adhering to said layers and bonding said layers together.

13. An electrode for electrolytic condensers comprising a layer of open mesh cloth and a layer of paper disposed in face-to-face contact and a multiplicity of particles of film-forming metal adhering to the fibres of said layers and to each other, and a metal terminal member sandwiched between said layers and bonded thereto by said metal particles, the outer face of said paper layer being free of metal particles.

14. An electrode for electrolytic condensers comprising a layer of cloth and a layer of paper disposed in direct face-to-face contact throughout substantially the entire effective electrode area and a multiplicity of particles of film-forming metal adhering to the fibres of said layers and to each other.

15. An electrode for electrolytic condensers comprising a layer of open mesh cloth and a layer of paper disposed in direct face-to-face contact and a spray-deposit of aluminum on and in said cloth layer and bonding said layers together, the outer face of said paper layer being free of sprayed metal.

CHARLES MARVIN BLACKBURN.

DISCLAIMER 2,297,607.—*Charles Marvin Blackburn*, Indianapolis, Ind. ELECTROLYTIC CONDENSER AND METHOD OF MAKING THE SAME. Patent dated September 29, 1942. Disclaimer filed December 7, 1944, by the assignee, *P. R. Mallory & Co., Inc.*

Hereby enters this disclaimer to claims 4, 5, 6, 7, 8, and 12 of said patent.

[*Official Gazette January 16, 1945.*]